July 10, 1923.

W. A. FORMAN

VALVE OR COCK

Filed Nov. 17, 1917

1,461,520

WITNESSES:
René Mine
Harry M. Brand

INVENTOR:
Walter A. Forman.
By Attorneys,
Fraser, Durk & Myers

Patented July 10, 1923.

1,461,520

UNITED STATES PATENT OFFICE.

WALTER A. FORMAN, OF BROOKLYN, NEW YORK.

VALVE OR COCK.

Application filed November 17, 1917. Serial No. 202,490.

*To all whom it may concern:*

Be it known that I, WALTER A. FORMAN, a citizen of the United States of America, residing in the borough of Brooklyn, county of Kings, city and State of New York, have invented certain new and useful Improvements in Valves or Cocks, of which the following is a specification.

This invention relates to valves or cocks for controlling the flow of substances which require to be heated, (or cooled) in their passage through the valve or cock. For this purpose a jacket is formed in the shell or casing of the valve or cock, so that a fluid at suitable temperature may be circulated through such jacket in order to bring the valve or cock to the desired temperature. Such valves or cocks are commonly used for controlling the flow of pitch, tar, asphalt, and other substances which are solid or nearly so, at normal temperatures, and require to be heated in order to maintain them fluid during their passage through the valve or cock.

In this specification the word "valve" will hereinafter be used in its generic sense to include any kind of valve, and being inclusive of a plug valve or cock.

The novel features of the invention will appear as the description proceeds.

The accompanying drawings show the preferred form of the invention as applied to a plug valve or ordinary turn-cock.

Figure 1:
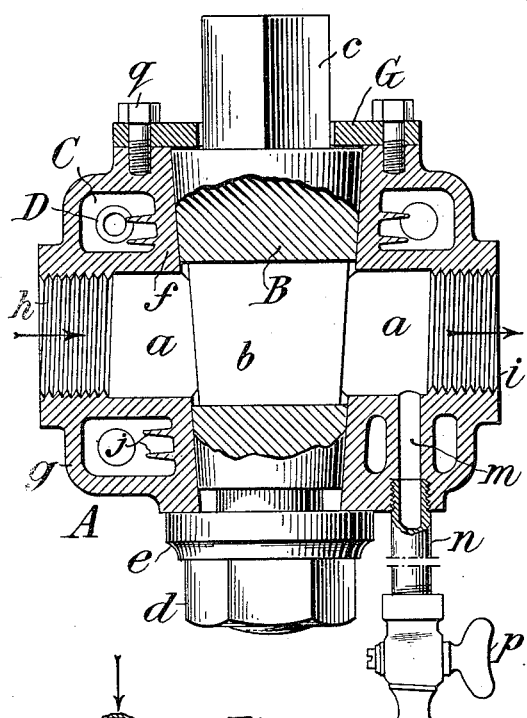
Figure 1 is a vertical section longitudinally of the fluid passage.

In the drawings A is the valve shell or casing as a whole, and B is the valve proper, which in this instance is a plug or turn-key having through it the usual port $b$ which communicates with the main through-way or passage $a\ a$ for the flow of material. The plug B is shown as of the usual construction, having a squared shank $c$ above to be engaged by a key for turning it, and the plug being of the usual tapered form with a nut $d$ and washer $e$ for holding it down in place. The shell A is formed with an inner wall $f$ closely enclosing the tapering socket for the plug, and with an outer wall $g$ spaced sufficiently far out from the inner wall to form a jacket chamber C of suitable capacity. Through this chamber a heating fluid (or it may be a cooling fluid) is caused to flow, being admitted through an inlet pipe D and discharged through an outlet pipe E. In the case of steam, the pipe D should enter the top of the jacket chamber and the pipe E should lead out from at or near the bottom thereof, and for convenience these pipes are commonly placed preferably on opposite sides. The valve shell has the usual threaded inlet opening $h$ and outlet opening $i$ into which to screw the connecting pipes, or is otherwise provided for suitable connection to vessels or other apparatus with which the valve is to be used.

Figure 2:
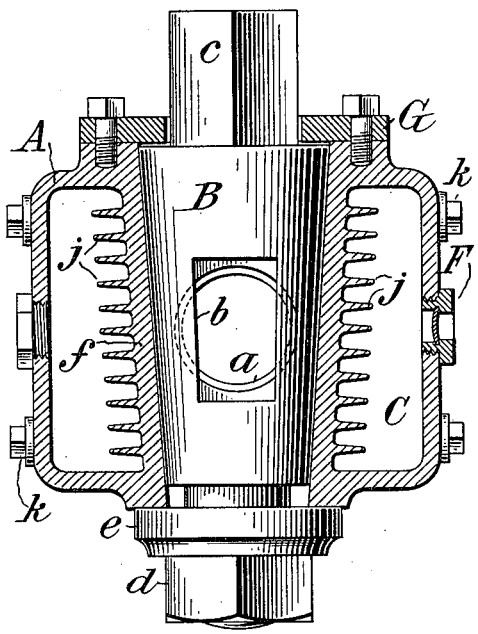
Fig. 2 is a vertical section transverse thereto.
Figure 3:
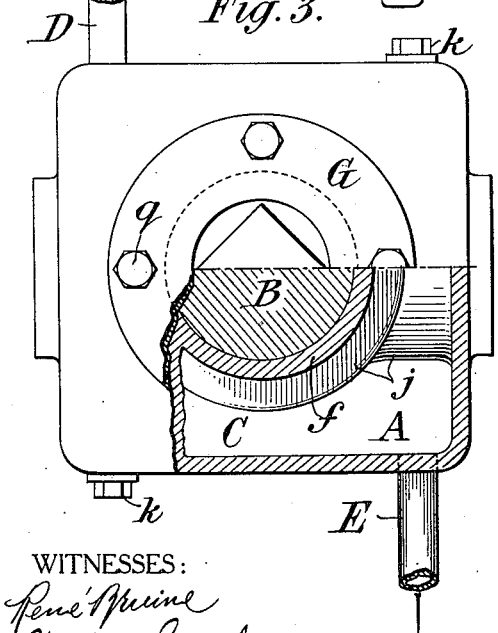
Fig. 3 is a plan, partly in horizontal section.

It is important to provide the most effective heat conduction between the inner wall of the valve casing and the fluid circulating within the jacket chamber, and for this purpose I form this inner wall with projections or flanges $j\ j$ which afford an increased surface for conducting heat from the heating fluid to the inner wall, (or vice versa) and thence to the valve chamber and to the passage $a$. These projections $j$ are preferably formed as parallel flanges, as shown in Figs. 2 and 3.

Figure 4:
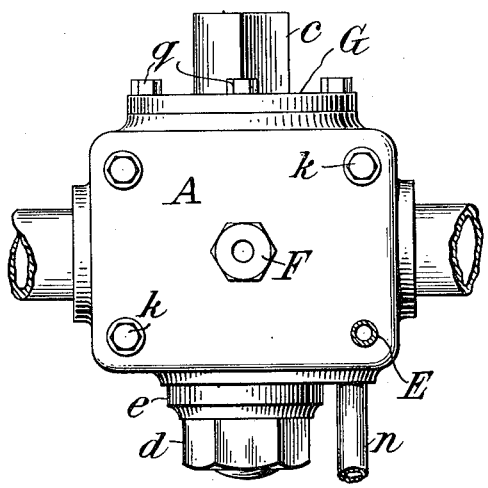
Fig. 4 is a side elevation on a smaller scale.

For forming the chamber C with the projections $j$ it is necessary to cast the valve casing by use of a suitable core, and to support this core it is necessary to employ core prints which pass through the wall of the casing. For this purpose it is preferable to form four openings on each side, these core-print openings being afterward closed in any suitable manner, as by tapping the holes and screwing in plugs $k$. The best arrangement for these openings is near the corners of the approximately rectangular shell, as shown in Fig. 4. Two of these openings may well be utilized for the introduction and discharge of the heating fluid. For this purpose the pipes D and E are tapped directly into the openings in place of screw plugs $k$. This saves the necessity of forming additional openings for the pipe connections.

It sometimes occurs with such jacketed valves that the valve is opened suddenly when the material under control (pitch, for instance) is highly heated, so that this very hot material flows rapidly through the valve and heats the valve casing to a temperature far higher than that of the medium circulating in the jacket. In the case of water or steam the heat thus suddenly added is liable to generate a very high pressure, which may burst the jacket before it can be relieved by means of the normal flow through the inlet or outlet pipes. To guard against bursting the valve jacket by this dangerous pressure, it is desirable to provide some safety device for instantly relieving the pressure. As the pressure is due to a high degree of heat, a thermic safety device is most efficacious. This is applied in cheap and convenient form by the application of an ordinary fusible plug. Such plug is shown at F and may be of any ordinary construction, such as the fusible plugs employed for steam boilers. Such a plug may work in two ways; in case the pressure increases to such point as to endanger the walls of the casing, with or without a serious rise in temperature, the fusible wall of the plug may serve as a frangible section of the wall of the casing, being materially weaker than such wall, so as to give way before the wall would be endangered; or upon the occurrence of such rise in temperature as will fuse the plug the latter will be fused and will blow out, or before fusing it may be so softened by heat that the pressure will blow it out, and in either case this will occur before the pressure or heat becomes sufficient to endanger the wall of the casing. The fusible plug might be introduced in one of the core openings in place of one of the plugs $k$, but, as it should be made larger than is necessary for these plugs, it is preferable to provide a separate and larger opening, which may be in the center, as shown.

In the use of valves for controlling substances such as pitch, which harden on cooling, it is desirable to be able to drain such material from the inlet side of the valve, so that on shutting down the material may be drained off while it is still heated, in order that it shall not harden in the passage. For this purpose a drainage duct $m$ is provided passing through the jacket C, so that it is a jacketed duct in which the material is heated and kept fluid. This duct may lead to any suitable drainage pipe, such as that shown at $n$, and this pipe may be controlled by a stopcock of any suitable sort, such as that shown at $p$. Or in place of the pipe $n$ the drainage duct $m$ may be simply closed by screwing in a plug, which may be removed for draining off the material.

In the case of a plug valve it sometimes happens that the plug sticks fast and that so much force is applied to turn it that the plug is broken or so weakened that it afterward breaks across. Such breakage is most apt to occur in a horizontal plane coincident with the passages $a$ $b$. For such breakage to occur while hot material such as pitch is communicating with the valve and under pressure, the top part of the plug might be blown out by the pressure, followed by the outflow of all or a large part of the pitch or other material, the escape of which it would be very difficult to stop. To guard against this accident, which would be accompanied by loss of a considerable quantity of valuable material, a safety device is provided for preventing the blowing out of any portion of the plug B. This in its simplest and preferred form consists of a collar G, which may be a simple flat ring of washer shape fastened to the top of the casing A and overhanging the top of the plug. By fastening it to the casing the latter may be formed with tapped holes entered by screws $q$, or any other suitable fastening means may be provided.

The construction may be modified according to the kind of valve which it is desired to employ, as will be obvious to those skilled in the art.

The duct $m$ may be useful to test the condition of the material within the pipe or passage from which it leads, so that the operator may know whether the material is sufficiently heated to have the requisite fluidity. For this purpose such duct may be applied to either side of the valve. If desired on the inlet side, the inlet pipe is attached at $i$ and the outlet at $h$.

While ordinarily steam is used as the heating medium, yet it is to be understood that for some purposes a higher temperature is required than is practicable with steam, and in such cases other heating fluids, such as heated oil, may be used.

What I claim is:—

1. A jacketed valve for controlling flow of normally solid or semi-solid material, having a heating jacket surrounding the plug chamber and outlet, with its casing having a drainage duct from the lower part of the valve passage adjacent the valve chamber, and in heat-conducting contact with said jacket adapted to drain off the contents of said passage when the valve is closed to prevent the solidifying of the material and avoid the locking fast of the plug.

2. The valve of claim 1, said drainage duct being on the outlet side of the plug and enclosed by the jacket to effectively heat the material within said duct while draining off.

3. A jacketed valve casing formed of inner and outer walls to enclose a jacket chamber, with a plurality of core-print openings through the outer wall on each of the opposite sides, one of such openings serving for connecting a pipe for the heating fluid, and plugs closing openings not so utilized.

4. The casing of claim 3, with such openings at different levels, an upper opening serving as an inlet for heating fluid and a lower opening serving as an outlet for such fluid.

5. A jacketed valve casing formed of inner and outer walls to enclose a jacket chamber, with a plurality of core-print openings through the outer wall into said chamber on each of two opposite sides of the valve, said openings being located to be at different levels when the valve is applied to either a horizontal or vertical pipe, so that in any such position of the valve the respective openings may enter the top and bottom portions of the chamber, an inlet pipe connected to an upper one of such openings, an outlet pipe for draining the chamber connected with a lower one of such openings, and plugs closing the remaining openings.

6. A jacketed plug valve comprising a casing and plug, the smaller end of the conical plug having screw-adjusting means for regulating the fit of the plug in the shell, combined with a safety device for preventing the blowing out of the larger end of the plug in case of rupture, consisting of a collar overlying the larger end of the plug and securely attached to the casing.

In witness whereof, I have hereunto signed my name.

WALTER A. FORMAN.